(No Model.) 2 Sheets—Sheet 2.

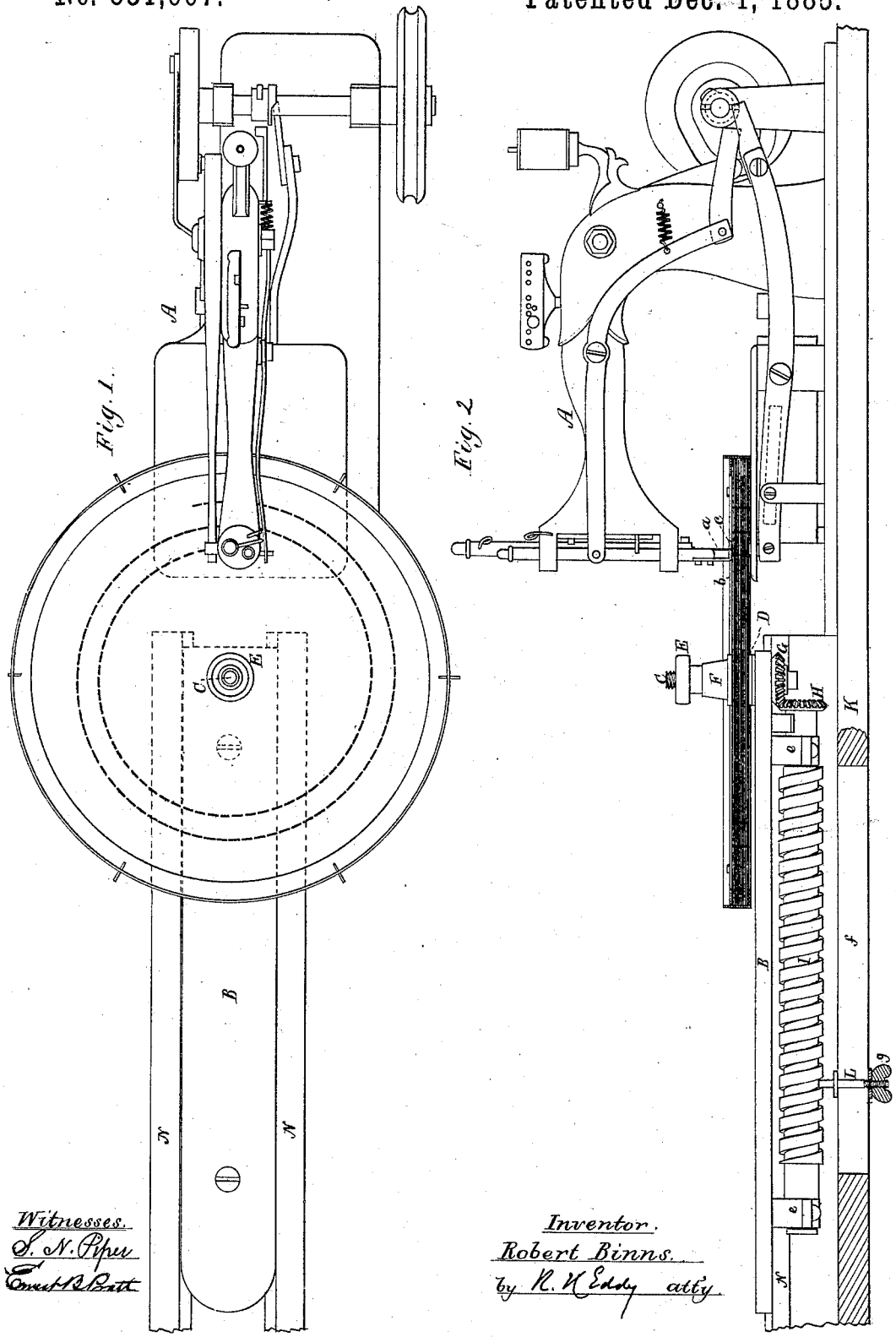

R. BINNS.
MACHINE FOR SEWING IN A SPIRAL OR HELICAL PATH.

No. 331,607. Patented Dec. 1, 1885.

Witnesses.

Inventor.
Robert Binns
by R. H. Eddy atty.

UNITED STATES PATENT OFFICE.

ROBERT BINNS, OF SOUTH WINDHAM, CONNECTICUT.

MACHINE FOR SEWING IN A SPIRAL OR HELICAL PATH.

SPECIFICATION forming part of Letters Patent No. 331,607, dated December 1, 1885.

Application filed May 6, 1885. Serial No. 164,554. (No model.)

*To all whom it may concern:*

Be it known that I, ROBERT BINNS, of South Windham, in the county of Windham, of the State of Connecticut, have invented a new and useful Improvement in Machines for Sewing in a Spiral or Helical Path; and I do hereby declare the same to be described in the following specification and represented in the accompanying drawings, of which—

Figure 3:
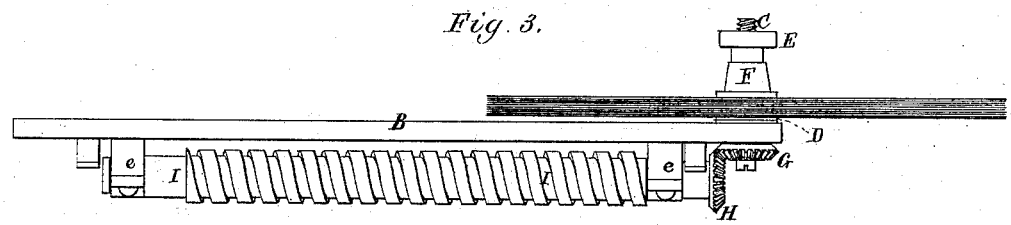
Figure 4:
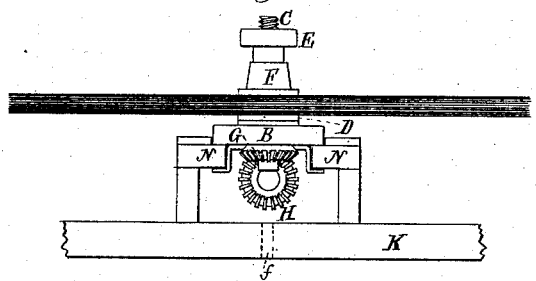
Figure 5:
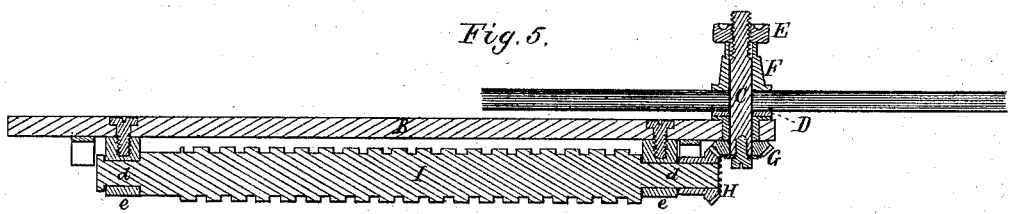

Figure 1 is a top view, and Fig. 2 a side elevation, of a sewing-machine provided with my invention. Fig. 3 is a side elevation, Fig. 4 an end view, and Fig. 5 a longitudinal section, of the auxiliary feeding mechanism, to be explained.

The nature of my invention is defined in the claims hereinafter presented.

In the said drawings, A denotes a sewing-machine, of which $a$ is the needle, $b$ the feeder, and $c$ the presser.

A sewing-machine having the above-mentioned characteristics—viz., the needle, feeder, and presser, and mechanism for properly operating them—is what the auxiliary feeding mechanism is to be used with to cause sewing to be done by the machine in a helical path.

In front of the sewing-machine is a carriage or bar, B, properly supported in guides N, so as to be movable rectilinearly toward and from the said sewing-machine. Pivoted within such bar near its front end, and extending both above and below the bar, is a short spindle, C, having fixed to it concentrically above the bar a toothed disk, D. The spindle is screw-threaded from its upper end downward to receive a nut, E, to work against the upper end of a tubular clamp, F, encompassing the spindle. The cloth or article to be sewed spirally or helically is to revolve with and to revolve the spindle, and is to rest on the toothed disk and to be pressed down upon such by the clamp, forced downward by the nut. The spindle, where below the bar B, has fastened on it a bevel-gear, G, that engages with another bevel-gear, H, fixed on one of the journals of a long screw, I, such screw being arranged under and parallel with the bar, and having its journals $d$ supported in boxes $e$, projecting downward from such bar. In the platform or table K, directly over which the bar B and the screw I are arranged, is a long slot, $f$, parallel with the screw. Extending down through such slot, as well as above it, is a screw-threaded stud, L, provided with a nut, $g$, for clamping it in position. This stud extends into the spiral groove of the screw. When the screw is revolved and the stud is clamped firmly in position, the carriage or bar B will be moved toward the sewing-machine, the top of such carriage being on a level, or about so, with that of the work-supporting plate of the sewing-machine.

From the above it will be evident that as the article or work to be stitched is fed forward by the feeder of the sewing-machine such article or work will not only be revolved with the spindle C, but will revolve such spindle, and thereby cause the screw to be revolved, in which case the carriage or bar, with the work, will be moved toward the sewing-machine. The continued movements of the work will cause the sewing to be effected in a helical path until the bar B may have advanced far enough for the stud to pass out of the spiral groove of the screw, in which case the work will continue to revolve in a circle and the sewing will be done in a circular instead of a helical path.

I claim—

1. The combination, with a sewing-machine, of the auxiliary feeding mechanism, substantially as described, consisting of the carriage or bar, supported so as to be movable longitudinally, as explained, the revoluble spindle, its clamp and nut and toothed disk, the bevel-gears, and screw and its stud, all being arranged and to operate substantially as and for the purpose set forth.

2. The auxiliary feeding mechanism, substantially as described, combined and for use with a sewing-machine in manner and for the purpose as explained, such mechanism consisting of the bar B, supported so as to be movable longitudinally and rectilinearly, the rotary spindle C, adapted to such bar, the clamp F and nut E and toothed disk D of such spindle, the screw I, supported by bearings projected from the bar B, the bevel-gears G and H, adapted to the spindle and screw, and the stud L, to engage with the screw, all being arranged essentially as represented.

ROBERT BINNS.

Witnesses:
HUBER CLARK,
JAMES J. ANDREWS.